3,108,986
THERMOSETTING ACRYLATE ESTER COPOLYMER ADHESIVES FOR VINYL - TO - METAL LAMINATES
Albert I. Goldberg, Berkeley Heights, and Irwin J. Davis, North Plainfield, N.J., assignors to National Starch and Chemical Corporation, New York, N.Y., a corporation of Delaware
No Drawing. Filed Apr. 20, 1960, Ser. No. 23,380
15 Claims. (Cl. 260—41)

This invention relates to novel organic thermosetting resins, their preparation and their use as adhesive compositions. More particularly, this invention relates to novel adhesive compositions ideally suited for use in the production of vinyl-to-metal laminates.

The manufacture of various products embodying vinyl-to-metal laminates has, of late, gained wide popularity. This new concept in metal finishing has been made possible by the bonding to steel, aluminum or magnesium, sheets of printed or embossed vinyl films (e.g. vinyl films derived from polyvinyl chloride as well as from copolymers of vinyl chloride with minor amounts of various comonomers; the latter films being pre-formed, self-supporting films). The use of vinyl-to-metal laminates have found excellent consumer acceptance in such diverse items as luggage, business machine cabinets, motion picture projector housings and television set cabinets. However, the production of these vinyl-to-metal laminates necessitates the use of adhesives which must meet many stringent requirements.

In preparing vinyl-to-metal laminates, the metal sheet or body is usually coated with a lacquer adhesive so as to yield a final dry film which may vary in thickness from about 0.1–1.0 mil depending upon the type of adhesive used and the end use requirements. The coated metal is then carried on a conveyor through a zoned oven in which the first zone removes the solvent component of the adhesive at a relatively low temperature of about 200° F. In the second zone, the adhesive coated metal is heated to a more elevated temperature, generally ranging from 375 to 425° F. so as to render the residual adhesive to a tacky or fluid state. After the adhesive has been brought to a temperature at which it will wet the vinyl film, the vinyl and adhesive coated metal sheet are contacted by passing both sheets through a cold nip roller. The laminate is then immediately quenched by a cold water spray so as to permit the retention of any embossed pattern which may be present on the vinyl film.

An adhesive to be acceptable for use in this process must bond the vinyl to the metal firmly enough so that the vinyl film tears before there is a separation of the laminate on attempted delamination of the film from its metal substrate. Furthermore, the adhesive bond must be maintained when the laminate is subjected to the deep drawing operation wherein it is placed in a mold and formed to the shape of a cavity by means of a positive mold applied at high pressure.

An attempt to meet the above described requirements was first made with the use of simple thermoplastic adhesives. However, as these vinyl-to-metal laminates found application in television cabinets, motion picture projector housings and other products wherein they were subjected to prolonged exposure at elevated temperatures, it was found that extensive delamination was occurring.

This delamination resulted from the inherent "memory" of the deep drawn vinyl film for its former configuration. That is, during the drawing or forming in the mold the laminate would develop internal stresses which would result in delamination of the vinyl-metal bond except for the presence of the restraining adhesive film. However, upon exposure to elevated temperatures the thermoplastic adhesive flows releasing the stresses, and resulting in a delamination of the vinyl film from the metal sheet.

The use of thermosetting resin adhesives has likewise been unsuccessful for reason that they are unable to flow and thus wet the vinyl film at the temperatures at which the vinyl film and adhesive coated metal sheet are contacted. Thus, a satisfactory thermosetting adhesive for a vinyl-to-metal laminate must be able to wet and adhere the vinyl film at the contacting temperatures of the vinyl film and adhesive and further be able to withstand subsequent elevated temperatures during usage of the vinyl coated metal sheet.

It is an object of this invention to provide an organic resinous adhesive that will effect a strong bond between a vinyl film and metal surface, such that during normal usage of the coated metal delamination of the bond will not occur.

We have now discovered that excellent results may be obtained in the preparation of vinyl-to-metal laminates, i.e., pre-formed, self-supporting vinyl films, bonded to metal substrates by employing the novel compositions of the invention. Generally stated, the compositions comprise a copolymer of methyl methacrylate and a beta-hydroxyalkyl ester of an alpha, beta-unsaturated carboxylic acid and a polyisocyanate cross-linking agent. In the preferred form, an inert mineral filler is also present. These compositions have been found to result in the production of exceedingly strong vinyl-to-metal laminates which may be exposed to high temperatures for prolonged periods and still resist delamination. Moreover, our compositions are completely adaptable to the procedures, as described above, which are now in use for the preparation of vinyl-to-metal laminates.

The methyl methacrylate-hydroxy ester copolymers utilized in our adhesive compositions are derived from the copolymerization of methyl methacrylate and a beta-hydroxyalkyl ester of an alpha, beta-unsaturated carboxylic acid. Beta-hydroxyalkyl esters are hydroxy esters wherein the hydroxyl (OH) group is attached to the beta carbon of the alkyl group as illustrated in the following formula:

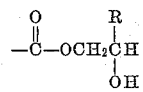

wherein R may be H or a methyl ($CH_3$) group, for example. Preferred beta-hydroxyalkyl esters are the beta-hydroxyalkyl esters wherein said alkyl group may contain from one to three carbon atoms. These esters may be produced by the reaction of an alkylene oxide and an alpha, beta-unsaturated carboxylic acid. For example, the reaction of ethylene or propylene oxide with acrylic, methacrylic, crotonic, fumaric, maleic, itaconic, citraconic, or aconitic acid and also with the water miscible acid salts and $C_1$–$C_4$ acid esters of maleic acid.

Copolymers having from 90 to 99%, by weight, of methyl methacrylate and from 1 to 10%, by weight, beta-hydroxyalkyl ester of an alpha, beta-unsaturated carboxylic acid have been found suitable. A method for making these beta-hydroxyalkyl esters is described in copending application Serial No. 843,644, filed October 1, 1959, now abandoned, assigned to the assignees of the present invention. As for the preparation of the copolymers of methyl methacrylate and the beta-hydroxyalkyl ester, these may follow procedures well known to those skilled in the art. The copolymer may thus be formed by any of the classical methods of vinyl polymerization. However, since ultimately the copolymer is to be employed in an organic solvent medium, it is convenient for this reason to conduct the polymerization as a solution polymerization with an organic solvent, for example such as ethyl acetate, methyl ethyl ketone, acetone, benzene or methyl isopropyl ketone, etc. as the continuous phase Example I, set forth hereinafter, is demonstrative of the process for forming such solution copolymers.

The polyisocyanate cross-linking agents react with the copolymer to substantially increase the softening point of the adhesive and thereby improve the heat resistance of the adhesive.

Since the polyisocyanates are extremely reactive with the copolymer, solidifying to a solid mass within a few days at room temperature and much more rapidly as the temperature is increased, it is necessary to temporarily deactivate or cap the polyisocyanate, or to add it to the copolymer just prior to the use of the adhesive.

Since it is desirable to provide a composite adhesive, that is, one wherein all the components are preesnt, it is preferred to use the deactivated polyisocyanates.

Polyisocyanates are organic compounds having more than one isocyanate (—N=C=O) group per molecule. In the case of the capped polyisocyanate, the polyisocyanate compounds may be reacted with alcohols or phenols. Phenol is the preferred capping agent. Its use results in the addition of phenol molecules to the isocyanate groups,

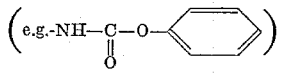

The presence of the phenol renders the isocyanate group stable in the sense that it is now unreactive to compounds containing reactive hydrogen atoms such as alcohols, acids, amines, water, or, as in the case with the products of our invention, the hydroxyl groups which are present along the chain of the methyl methacrylate: beta-hydroxyalkyl ester copolymers. The uncapped polyisocyanates, on the other hand, readily react with these reactive hydrogen compounds. Thus, for example, in our adhesive compositions, the reaction would involve a cross-linking of the copolymer yielding a thermoset, polymeric structure, having the following general formula:

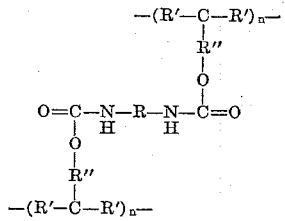

wherein

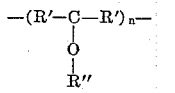

represents the copolymer moiety and

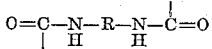

represents the polyisocyanate moiety of the final product.

By heating the capped polyisocyanates, they may be uncapped or converted to the reactive polyisocyanate form. Thus, for example, by being heated to a temperature above 285° F., the phenolic capped polyisocyanates are uncapped. This liberates the phenol and reforms the reactive isocyanate groups, which can then react with the active hydrogen atoms of the copolymer's hydroxyl groups. Thus, by employing capped polyisocyanates, we are able to incorporate the polyisocyanate with the copolymer and provide a composite material that does not require last minute combination of components prior to use. In other words, the copolymer-capped polyisocyanate adhesive may be prepared and stored until needed without substantially decreasing the tacky or fluid properties of the adhesive. When using, the composite adhesive is applied to the metal sheet and the temperature of the coated sheet elevated to the point where the adhesive becomes tacky, whereupon the vinyl film and adhesive are contacted.

Capping with phenol is merely illustrative of a way of desensitizing the polyisocyanate. Other methods of deactivating the polyisocyanate are within the scope of this invention. The only requisite is that the deactivation be temporary and that the capped polyisocyanate be capable of regenerating the polyisocyanate after contacting the adhesive with the vinyl film.

In some instances, it may be possible to use uncapped polyisocyanates as, for example, where the lamination will occur shortly after the addtion of the polyisocyanate to the copolymer. At ambient temperature the cross-linking reaction is not extremely rapid, and thus, the adhesive solution containing the uncapped polyisocyanate would be sufficiently stable to be applied for as long as 1–3 days before the cross-linking reaction had effected a solidification of the adhesive.

For most applications it is desirable to use an inert mineral filler. Materials such as clay, talc, diatomaceous earth, or silica are suitable. However, for optimum results we prefer to use calcined clays. These calcined clays are natural clays (i.e. hydrated aluminum silicates) which have been heated to remove their water of hydration, thereby altering their particle shape and increasing their oil absorption. The increased oil absorption may allow for greater absorption of the methyl methacrylate: beta-hydroxyalkyl ester copolymer. That is, the calcined clays are more readily wetted with the result that adhesion to the surface and vinyl film is improved. However, no matter what type of inert mineral filler is used, its presence will in all cases increase the heat resistance of our adhesive compositions.

Of still greater importance is the fact that these fillers improve the adhesive properties of our compositions. Thus, if our compositions are prepared without the inclusion, therein, of inert fillers, the resulting vinyl-to-metal laminates are less resistant to delamination. However, they are still an improvement over the prior art.

With respect to proportions, it has already been stated that the methyl methacrylate:beta-hydroxyalkyl ester copolymer may contain from 90 to 99% of methyl methacrylate and from 1 to 10% of the respective beta-hydroxyalkyl ester of alpha, beta-unsaturated carboxylic acid. The amount of polyisocyanate cross-linking agent may vary from 2 to 20%, based on the weight of copolymer solids. As for the inert mineral filler, this may be present in quantities ranging from 25 to 75% based on the total weight of nonvolatile solids, including copolymer, polyisocyanate, and mineral filler. The presence of inert mineral filler in amounts in excess of 75% of the total weight of nonvolatile solids should be avoided as it has been found to have an adverse effect upon the adhesive and deep drawing properties of the resulting vinyl-to-metal laminates. The use of an inert mineral filler in amounts less than our suggested minimum of 25% will, of course, minimize the advantages which the use of such a filler makes possible when it is present in an amount falling within our suggested range. Generally, it is desirable to use the above-described adhesive compositions in an organic solvent. The total solids content (i.e. copolymer, cross-linking agent, and filler) of our compositions may vary from 10 to 60%, by weight, with the remainder comprising the appropriate organic solvent. We prefer, however, to operate in the more convenient range of from 15 to 40% by weight of solids.

In preparing our adhesive compositions, a solution or dispersion of the polyisocyanate cross-linking agent is admixed with the solution of the methyl methacrylate: beta-hydroxyalkyl ester copolymer. The inert material filler is then introduced. In the case of those compositions containing a capped polyisocyanate, the practitioner will be able to employ these compositions in the form of stable, one-package products wherein there is no danger of cross-linking occurring until the processing temperature exceeds the uncapping temperature of the specific polyisocyanate being employed. When using uncapped, reactive polyisocyanates, the practitioner will, however, have to add the latter to the solvent mixture of copolymer and inert filler only at a time relatively close to the start of the laminating process.

In using these adhesives for the bonding of vinyl-to-metal laminates, they are ordinarily applied to the metal sheet in solutions having an approximate solids content of 20%, by weight. They are coated so as to give a final, dry film with an optimum thickness of 0.2 mil or less. As previously described, in the usual practice, the coated metal sheet is heated in a zone oven, first at a temperature of about 200° F. for a period of from 1 to 5 minutes so as to remove the solvent from the adhesive. The sheet is then heated for from 0.5 to 7 minutes at a temperature which should preferably be above 400° F. At this high temperature, the adhesive flows and thus wets the vinyl film which is then combined with the coated metal sheet by means of a cold nip roller. After being cold nipped, the vinyl-to-metal laminate is then immediately quenched in cold water so as to preserve the embossing of the surface of the vinyl film.

The following examples will further illustrate the embodiment of our invention. In these examples all parts given are by weight unless otherwise noted.

*Example I*

This example illustrates the preparation and use of our vinyl-to-metal laminating adhesives.

A methyl methacrylate:beta-hydroxyethyl acrylate copolymer was first prepared by introducing a mixture comprising:

100 parts of methyl methacrylate (monomer)
5 parts of beta-hydroxyethyl acrylate (monomer)
150 parts of ethyl acetate (solvent)
1 part of benzoyl peroxide (catalyst)

into a reaction vessel equipped with a reflux condenser and a mechanical agitator. Under agitation, this mixture was heated to reflux (180° F.) and maintained at this temperature for 6 hours. The resulting methyl methacrylate:beta-hydroxyethyl acrylate (95:5) copolymer had a solids content of 40.0%, by weight, indicating a conversion of 98%. The intrinsic viscosity, in acetone, of this copolymer was 0.25.

To 100 parts of the above described solution copolymer was added 8 parts of 1:1 solution of Mondur S in ethyl acetate. (Mondur S) being a capped polyisocyanate having the formula:

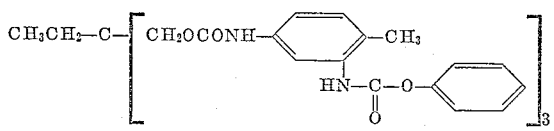

The resulting mixture, comprising a non-settling colloidal dispersion of the Mondur S in the copolymer solution, contained 10%, by weight, of capped polyisocyanate cross-linking agent, based on the weight of the copolymer solids. To this mixture was then added 49.4 parts of a calcined aluminum silicate clay (Alsilate-W). This quantity of calcined clay amounted to 53% of the total weight of nonvolatile solids including the calcined clay. The resulting adhesive composition was remarkably stable, showing no signs of any solidification or other deterioration for periods of up to 3 months or more.

In using the above described adhesive preparation as a vinyl-to-metal laminating adhesive, it was first diluted with sufficient methyl isobutyl ketone so as to give a solution having a total solids content of 28.1%. This solution was applied to a cold rolled steel sheet using a Bird applicator which was adjusted so as to yield a final dry film having a thickness of 0.2 mil. The coated steel sheet was then placed on a conveyor belt and carried into a zoned oven where it was first subjected to a temperature of 200° F. for a period of 1 minute, to remove the solvent from the adhesive film. In the next zone, the sheet was subjected to a temperature of 450° F. for a period of 2 minutes. At this temperature the adhesive film readily wet a 12 mil, embossed polyvinyl chloride film which was combined with the metal sheet by means of cold nip rollers situated at the exit of the zone oven. The resulting laminate was then immediately quenched with a cold water spray so as to permit the retention of the embossed pattern.

At this point the laminate, as well as additional samples prepared by the same procedure, were subjected to a series of tests in order to determine the physical properties displayed by the vinyl-to-metal laminates bonded with our adhesive compositions.

The adhesive characteristics of the flat laminates were first determined by noting the effects of attempting to peel apart or separate the vinyl film from the metal sheet. An excellent bond, as indicated by a tearing of the vinyl film, showed that the tensile strength of the bond was greater than that of the vinyl film.

Another sample was then cut with a pattern consisting of two sets of parallel lines which were spaced at a distance of ¼". These two sets of parallel lines were drawn so that they intersected each other at right angles, forming a ¼" square at the point where they intersected. These lines were scored completely through the entire thickness of the 12 mil polyvinyl chloride film. A bubble was then drawn in the scored laminate by placing the sample in a die and forcing a steel ball a distance of ⅜" through the laminate so as to have the geometric center of the drawn bubble coincide with the ¼" square resulting from the intersection of the two sets of scored parallel lines. The bubble was then examined for any spontaneous loss of adhesion, i.e. delamination, resulting from the deformation of the drawing operation. An adhesive which broke down during deformation of the laminate would cause a spontaneous lifting of the vinyl film along the scored lines; however, our samples displayed a complete absence of delamination thus indicating that our adhesive had withstood the strain of deformation. As for the adhesive characteristics displayed by the laminate after the deep drawing operation, these were determined by attempting to peel back the laminate, with a pen knife, in the deformed or drawn area. Good adhesion was indicated by an inability to peel back the laminate.

To test for heat resistance after deformation, another sample, which had been scored and drawn according to the above described procedure, was placed, for one hour, in an oven set at a temperature of 250° F. Under these conditions an adhesive which is unsatisfactory in regard to heat resistance, would be softened and thus release stresses induced in the vinyl film during the deep drawing operation. Such a release of stress would reveal itself in the form of creep back or a lifting of the vinyl film from the metal during exposure within the high temperature oven. The laminates of this invention were completely free from any creep back or lifting of the film.

Example II

This example illustrates the preparation of a vinyl-to-metal laminating adhesive based on a copolymer of methyl methacrylate and beta-hydroxyethyl methacrylate.

A methyl methacrylate:beta-hydroxyethyl methacrylate copolymer was first prepared by introducing a mixture comprising:

98 parts of methyl methacrylate (monomer)
2 parts of beta-hydroxyethyl methacrylate (monomer)
150 parts of ethyl acetate (solvent)
1 part of benzoyl peroxide (catalyst)

into a reaction vessel equipped with reflux condenser and a mechanical agitator. Under agitation, this mixture was heated to reflux (180° F.) and maintained at this temperature for 6 hours. The resulting methyl methacrylate: beta-hydroxyethyl methacrylate (98:2) copolymer had a solids content of 38.6%, by weight, indicating a conversion of 96.5%. The intrinsic viscosity, in acetone, of this copolymer was 0.22.

To 100 parts of the above described solution copolymer we then added 9.25 parts of a 1:1 solution of Mondur S in ethyl acetate. Thus, the resulting mixture, comprising a non-settling colloidal dispersion of the Mondur S in the copolymer solution, contained 12% of the capped polyisocyanate cross-linking agent, based on the weight of copolymer solids. To this mixture there was then added 14.4 parts of a calcined aluminum silicate clay (Glomax HE). This quantity of calcined clay amounted to 25% of the total weight of nonvolatile solids including the calcined clay. The resulting adhesive composition was remarkably stable, showing no signs of any solidification or other deterioration for periods of up to 3 months or more.

The above described adhesive composition was used for the bonding of a vinyl-to-metal laminate by means of the procedure described in Example I. When samples of the resulting laminate were subjected to the various testing procedures described in Example I, they were found to have excellent physical properties generally comparable to those described for the laminate of Example I.

Example III

This example illustrates the preparation of a vinyl-to-metal laminating adhesive based on a copolymer of methyl methacrylate and beta-hydroxyproply acrylate.

A methyl methacrylate:beta-hydroxypropyl acrylate copolymer was first prepared by introducing a mixture comprising:

90 parts of methyl methacrylate (monomer)
10 parts of beta-hydroxypropyl acrylate (monomer)
150 parts of ethyl acetate (solvent)
1 part of benzoyl peroxide (catalyst)

into a reaction vessel equipped with a reflux condenser and a mechanical agitator. Under agitation, this mixture was heated to reflux (180° F.) and maintained at this temperature for 8 hours. The resulting methyl methacrylate:beta-hydroxypropyl acrylate (90:10) copolymer had a solids content of 38.2%, by weight indicating a conversion of 95.5%. The intrinsic viscosity, in acetone, of this polymer was 0.20.

To 100 parts of the above described solution copolymer was added 11.46 parts of a 1:1 solution of Mondur S in ethyl acetate. Thus, the resulting mixture, comprising a non-settling colloidal dispersion of the Mondur S in the copolymer solution, contained 15% of the capped polyisocyanate cross-linking agent, based on the weight of copolymer solids. To this mixture was then added 131.8 parts of a diatomaceous earth, predominantly silica (SiO$_2$), (Celite 281). This quantity of inert mineral filler amounted to 75% of the total weight of nonvolatile solids including the diatomaceous earth. The resulting adhesive composition was remarkably stable, showing no signs of any solidification or other deterioration for periods of up to 3 months or more.

The above described adhesive laminate was used for the bonding of a vinyl-to-metal laminate by means of the procedure described in Example I. When samples of the resulting laminate were subjected to the various testing procedures described in Example I, they were found to have excellent physical properties generally comparable to those described for the laminate of Example I.

Example IV

This example illustrates the preparation of a vinyl-to-metal laminating adhesive which is cross-linked with an uncapped polyisocyanate.

A methyl methacrylate:beta-hydroxyethyl acrylate copolymer was first prepared by introducing a mixture comprising:

99 parts of methyl methacrylate (monomer)
1 part of beta-hydroxethyl acrylate (monomer)
150 parts of ethyl acetate (solvent)
0.8 part of benzoyl peroxide (catalyst)

into a reaction vessel equipped with reflux condenser and a mechanical agitator. Under agitation, this mixture was heated to reflux (180° F.) and maintained at this temperature for 6 hours. The resulting methyl methacrylate: beta-hydroxyethyl acrylate (99:1) copolymer had a solids content of 39.0%, by weight, indicating a conversion of 97.5%. The intrinsic viscosity, in acetone, of this copolymer was 0.32.

To 100 parts of the above described solution copolymer we then added 1.6 parts of a 1:1 solution of Nacconate 310 in ethyl acetate. (Nacconate 310) being an uncapped polyisocyanate having the formula:

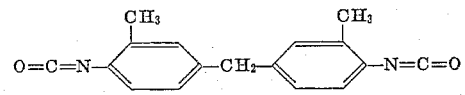

Thus, the resulting mixture of the Nacconate 310 in the copolymer solution, contained 2% of the uncapped polyisocyanate cross-linking agent as based on the weight of copolymer solids. To this mixture there was added 32.5 parts of a fibrous talc (magnesium silicate—Nytal 300). This quantity of inert mineral filler amounted to 45% of the total weight of nonvolatile solids including the fibrous talc. Since the resulting adhesive composition had been prepared with an uncapped polyisocyanate cross-linking agent, it did not of course have the stability displayed by the aforedescribed compositions containing capped polyisocyanates. As a result, it was necessary to use this formulation within one to two days after its preparation.

The above described adhesive composition was used for the bonding of a vinyl-to-metal laminate by means of the procedure described in Example I. When samples of the resulting laminate were subjected to the various testing procedures described in Example I, they were found to have excellent physical properties generally comparable to those described for the laminate of Example I.

Example V

This example illustrates the preparation of a vinyl-to-metal laminating adhesive based on a copolymer of methyl methacrylate and beta-hydroxyethyl crotonate.

A methyl methacrylate:beta-hydroxyethyl crotonate copolymer was first prepared by introducing a mixture comprising:

97 parts of methyl methacrylate (monomer)
3 parts of beta-hydroxyethyl crotonate (monomer)
150 parts of ethyl acetate (solvent)
1.5 parts of benzoyl peroxide (catalyst)

into a reaction vessel equipped with reflux condenser and a mechanical agitator. Under agitation, this mixture was heated to reflux (180° F.) and maintained at this temperature for 10 hours. The resulting methyl methacrylate:beta-hydroxyethyl crotonate (97:3) copolymer had a solids content of 37.4%, by weight, indicating a conversion of 93.5%. The intrinsic viscosity, in acetone, of this polymer was 0.16.

To 100 parts of the above described solution copolymer we then added 15 parts of a 1:1 mixture of Mondur S in ethyl acetate. Thus, the resulting mixture, comprising a non-settling colloidal dispersion of the Mondur S in the copolymer solution, contained 20% of the capped polyisocyanate cross-linking agent as based on the weight of copolymer solids. To this mixture there was then added 55 parts of a natural, hydrated aluminum silicate clay (ASP 900). This quantity of calcined clay amounted to 55% of the total weight of non-volatile solids including the hydrated clay. The resulting adhesive composition was remarkably stable, showing no signs of solidification or other deterioration for periods of up to 3 months or more.

The above described adhesive composition was used for the bonding of a vinyl-to-metal laminate by means of the procedure described in Example I. When samples of the resulting laminate were subjected to the various testing procedures described in Example I, they were found to have excellent physical properties generally comparable to those described for the laminate of Example I.

*Example VI*

This example illustrated the unsatisfactory results obtained in the bonding of a vinyl-to-metal laminate with an adhesive which did not contain the necessary cross-linking agent.

We prepared an adhesive composition similar to that described in Example I with the exception, however, that the Mondur S cross-linking agent was omitted from the formulation. This adhesive was used for the bonding of a vinyl-to-metal laminate by means of the procedure described in Example I. When samples of the resulting laminate were subject to the various testing procedures described in Example I, it was noted that they all displayed a complete lack of heat resistance after the deformation induced by the deep drawing operation. This was evidenced by a creep back and lifting of the vinyl film from the metal during exposure of the deep drawn samples within the high temperature oven. This resulted from the softening of the adhesive and the consequent release of stresses induced in the vinyl film during the deep drawing operation.

Summarizing, our invention provides the practitioner with novel vinyl-to-metal laminating adhesives which are fully resistant to the effects of prolonged exposure to high temperatures and which are also fully adaptable to existing vinyl-to-metal laminating techniques. Variations may be made in procedures, proportions and materials without departing from the scope of our invention which is limited only by the following claims.

We claim:

1. An adhesive composition particularly adapted for the bonding of pre-formed, self-supporting vinyl films to metal substrates comprising (1) a copolymer of methyl methacrylate and a beta-hydroxyalkyl ester of an alpha, beta-unsaturated carboxylic acid, said copolymer having been prepared by means of addition polymerization techniques, (2) a blocked polyisocyanate cross-linking agent and (3) an inert mineral filler.

2. The adhesive composition of claim 1 wherein the alkyl group of said beta-hydroxyalkyl ester of the alpha, beta-unsaturated carboxylic acid may contain up to 3 carbon atoms.

3. The adhesive composition of claim 1 wherein the alpha, beta-unsaturated carboxylic acid of said beta-hydroxyalkyl ester of an alpha, beta-unsaturated carboxylic acid may be selected from the group consisting of acrylic, methacrylic, crotonic, fumaric, maleic, itaconic, citraconic and aconitic acids, and the water miscible acid salts of maleic acid and the water miscible acid esters of maleic acid containing from 1 to 4 carbon atoms in the alkyl group.

4. The adhesive composition of claim 1 wherein said polyisocyanate cross-linking agent is a phenol blocked polyisocyanate.

5. The adhesive composition of claim 1 wherein said inert mineral filler may be selected from the group consisting of calcined clays, natural hydrated clays, diatomaceous earth, talc, and silica.

6. The adhesive composition of claim 1 wherein said copolymer may contain from 90 to 99% by weight of methyl methacrylate and from 1 to 10% by weight of said beta-hydroxyalkyl ester of an alpha, beta-unsaturated carboxylic acid.

7. An adhesive composition particularly adapted for the bonding of pre-formed, self-supporting vinyl films to metal substrates comprising (1) a copolymer of methyl methacrylate and a beta-hydroxyalkyl ester of an alpha, beta-unsaturated carboxylic acid, said copolymer having been prepared by means of addition polymerization techniques, (2) from 2 to 20% by weight of said copolymer solids of a blocked polyisocyanate cross-linking agent and (3) an inert mineral filler in an amount ranging from 25 to 75% as based on the total weight of nonvolatile solids including said copolymer, polyisocyanate cross-linking agent, and inert mineral filler, said composition dispersed in an organic solvent.

8. A laminate wherein the laminae comprise a metal substrate and a pre-formed, self-supporting vinyl film, said laminae being bonded to each other with the adhesive of claim 1.

9. In the process of preparing a laminate wherein the laminae of said laminate comprise a metal substrate and a pre-formed, self-supporting vinyl film, the step which comprises the application of an adhesive composition comprising (1) a copolymer of methyl methacrylate and a beta-hydroxyalkyl ester of an alpha, beta-unsaturated carboxylic acid, said copolymer having been prepared by means of addition polymerizataion techniques, (2) a blocked polyisocyanate cross-linking agent and (3) an inert mineral filler to the surface of at least one of said laminae.

10. The step of claim 9 wherein the alkyl group of said beta-hydroxyalkyl ester of the alpha, beta-unsaturated carboxylic acid may contain up to 3 carton atoms.

11. The step of claim 9 wherein the alpha, beta-unsaturated carboxylic acid of said beta-hydroxyalkyl ester of an alpha, beta-unsaturated carboxylic acid may be selected from the group consisting of acrylic, methacrylic, crotonic, fumaric, maleic, itaconic, citraconic and aconitic acids, and the water miscible acid salts of maleic acid and the water miscible acid esters of maleic acid containing from 1 to 4 carbon atoms in the alkyl group.

12. The step of claim 9 wherein said cross-linking agent is a phenol blocked polyisocyanate.

13. The step of claim 9 wherein said inert mineral filler may be selected from the group consisting of calcined clays, natural hydrated clays, diatomaceous earth, talc and silica.

14. The step of claim 9 wherein said copolymer may contain from 90 to 99% by weight of methyl methacrylate and from 1 to 10% by weight of said beta-hydroxyalkyl ester of an alpha, beta-unsaturated carboxylic acid.

15. In the process of preparing a laminate wherein the laminae of said laminate comprise a metal substrate and a pre-formed, self-supporting vinyl film, the step which comprises the application to the surface of at least one of said laminae of an adhesive composition comprising (1) a copolymer of methyl methacrylate and a beta-hydroxalkyl ester of an alpha, beta-unsaturated carboxylic acid said copolymer having been prepared by means of addition polymerization techniques, (2) from 2 to 20% by weight of said copolymer solids of a blocked polyisocyanate cross-linking agent and (3) an inert mineral filler in an amount ranging from 25 to 75% as based on the total weight of nonvolatile solids including said copolymer, polyisocyanate cross-linking agent, and inert mineral filler, said composition being dispersed in an organic solvent.

References Cited in the file of this patent

UNITED STATES PATENTS

| | | |
|---|---|---|
| 2,381,063 | Kung | Aug. 7, 1945 |
| 2,681,897 | Frazier et al. | June 22, 1954 |
| 2,723,265 | Stallmann | Nov. 8, 1955 |
| 2,850,424 | Finelli et al. | Sept. 2, 1958 |
| 2,865,896 | Fekete | Dec. 23, 1958 |
| 2,916,472 | Nischk et al. | Dec. 8, 1959 |
| 3,023,126 | Underwood et al. | Feb. 27, 1962 |